G. BARCLAY & J. KENNEDY.
Horse Hay-Rake.
No. 168,552. Patented Oct. 11, 1875.
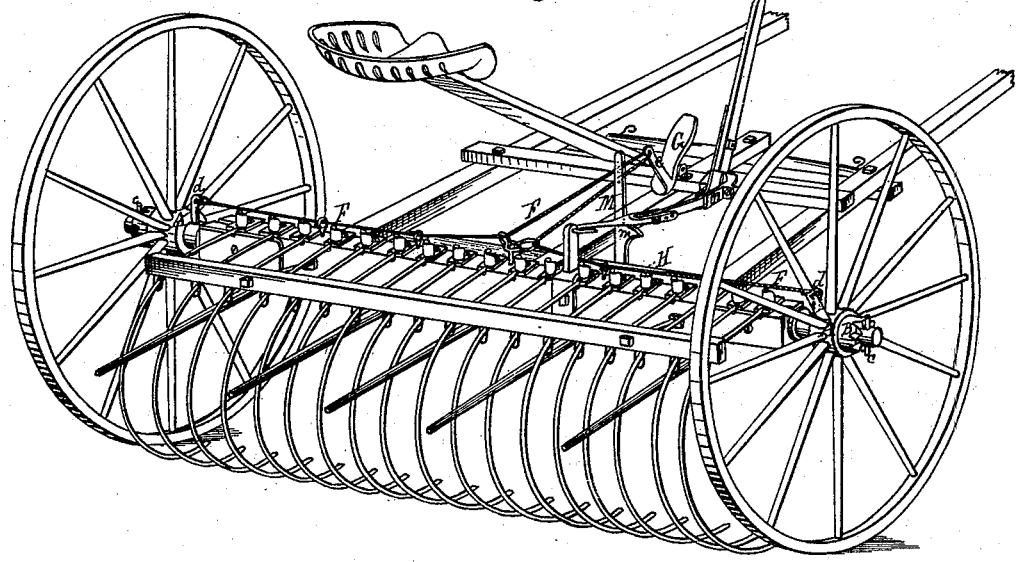
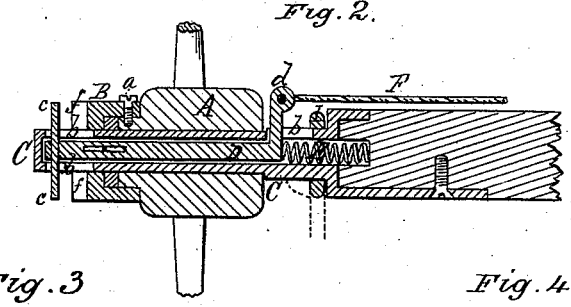
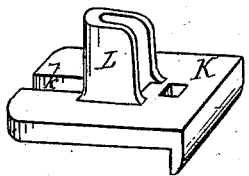 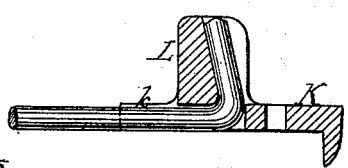
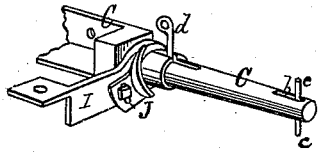
Witnesses.
N. B. Smith
H. C. Barclay
Inventors.
George Barclay
James Kennedy
by S. K. Smith
Attorney

UNITED STATES PATENT OFFICE.

GEORGE BARCLAY AND JAMES KENNEDY, OF OSHAWA, CANADA.

IMPROVEMENT IN HORSE HAY-RAKES.

Specification forming part of Letters Patent No. 168,552, dated October 11, 1875; application filed January 19, 1875.

*To all whom it may concern:*

Be it known that we, GEORGE BARCLAY and JAMES KENNEDY, both of Oshawa, in the county of Ontario, in the Province of Ontario, Dominion of Canada, have invented certain new and useful Improvements in Horse Hay-Rakes, of which the following is a full, clear, and exact description, reference being had to the accompanying drawing, making part of this specification, in which—

Figure 1 is a perspective view of a horse hay-rake with our improvements applied. Fig. 2 is a section of the hub and axle. Fig. 3 is a perspective view of the tooth-holder. Fig. 4 is a vertical section of the same; and Fig. 5 is a perspective view of the end of the axle and the draft-bracket, showing the cam for throwing the dumping devices out of engagement.

Similar letters of reference denote corresponding parts in all the figures.

The first part of our invention relates to a means for dumping the rake, and the second part to a tooth-holder for securing the teeth to the axle; and it consists, first, in the combination of a spring shooting-bar, hollow axle-skein, and radial-grooved collar secured to the outer end of the wheel-hub, whereby a pin on the shooting-bar engages with the grooved collar, and elevates the teeth secured thereto, when the load is to be dumped by the partial rotation of the axle; second, a draw-bracket secured to the draw-bar, sleeved to form a bearing for axle, having a cam projection, engaging with a projecting pin secured to the shooting-bar, to throw dumping connection out of engagement automatically; third, in combining, with the hand-lever and the link connecting said lever with the rake-head, a pivoted lever for locking the joint between the hand-lever and link, and thereby holding the rake down to its work; fourth, a tooth-holder having a vertical slotted projection and horizontally-slotted bed-plate bolted to the axle, and receiving the bent end of the teeth vertically.

In the drawing, A is the wheel-hub. B is a collar fitting thereon, and secured thereto removably by a screw, $a$, or other contrivance. C is a hollow axle or skein. D is a shooting-bar sliding in the hollow axle C, and E a spiral spring therein to project the bar D after retraction by the operator. $b$ are longitudinal slots in the hollow axle, through which the pin $c$ and arm $d$, inserted near the ends of the bar D, project. $f$ are radial grooves in collar B. F is a chain, rope, or wire fastened to the arm $d$, and connecting with the lever $e$, secured to the foot-bracket G. When the toe of bracket G is depressed the bar D is drawn inwardly, and brings the pin $c$ into engagement with the radial grooves in the collar B, and causes the wheel to partially rotate the axle, thereby lifting the rake-teeth to dump the load. The wheel of the rake is retained on the hollow axle by a washer and pin between the hub and collar B, and a slot in the shooting-bar D, through which the pin passes, prevents the interference of the pin with the action of the shooting-bar. H is the draw-bar, connected to the axle by draw-brackets I, which are sleeved on the axle and bolted to the draw-bar. J is a cam projection on the side of the draw-bar brackets, with which the arm $d$ comes in contact when the axle turns in dumping, and moves the shooting-bar endwise, thus throwing the pin $c$ out of engagement with the radial grooves in the collar B automatically, thereby allowing the rake-teeth, after dumping, to fall to raking position. When the rake is not dumping, the spiral spring E keeps the bar D projected, so that the pin $c$ will be out of engagement with the radial grooves $f$. This portion of our machine is applicable to a rake having either a wooden, iron, or steel axle. The foot-bracket G is hinged centrally to its pivotal connection on the rake-bar, so that either a heel or toe pressure can be exerted by the foot of the operator, and affording a rest for his foot when neither a heel nor toe pressure is exerted to operate the dumping mechanism. The rake-teeth are independently secured to the axle by means of holders K, separately bolted thereto. The teeth-holders K are formed with a slot, $k$, in the base of the holder, to prevent lateral movement of the tooth, and a slotted vertical projection, L, to receive the bent end of the rake-tooth. The holder is secured to the axle by a bolt entering the axle. A lever, M, pivoted to the draft-bar H, or other convenient point on the draft-frame, is provided with a spur, *m*, at a proper height to be thrust under the link which connects the rake-head with the hand-lever, for locking the joint between said link and hand-lever, and thereby preventing an obstruction or the weight of the load from accidentally dumping the rake. The lever M may be operated either by hand or by the foot, as may be most convenient.

Having thus described our invention, what we claim as new, and desire to secure by Letters Patent, is—

1. The combination of the spring shooting-bar D, having pin *c*, slotted hollow axle C, and collar B, having radial grooves *f*, with the wheel A, to operate substantially as described, for the purpose set forth.

2. The draw-bracket I, sleeved on the axle, and provided with the cam projection J, in combination with the bar D, provided with the arm *d*, and arranged within the hollow axle, and operating substantially as described.

3. The pivoted locking-lever M, provided with the spur or shoulder *m*, and operating in combination with the link-connection between the hand-lever and rake-head, as described, for holding the rake down to its work.

4. The tooth-holder K, bolted to the axle, and formed with a slotted vertical projection, L, and having a slot, *k*, in the base to hold the tooth in position, substantially as set forth.

GEORGE BARCLAY.
JAMES KENNEDY.

Witnesses:
LYMAN ENGLISH,
JOHN MOTHERSILE.